Nov. 13, 1951     E. KNAUSS     2,574,700
DIAPHRAGM POWER CHAMBER
Filed April 29, 1944
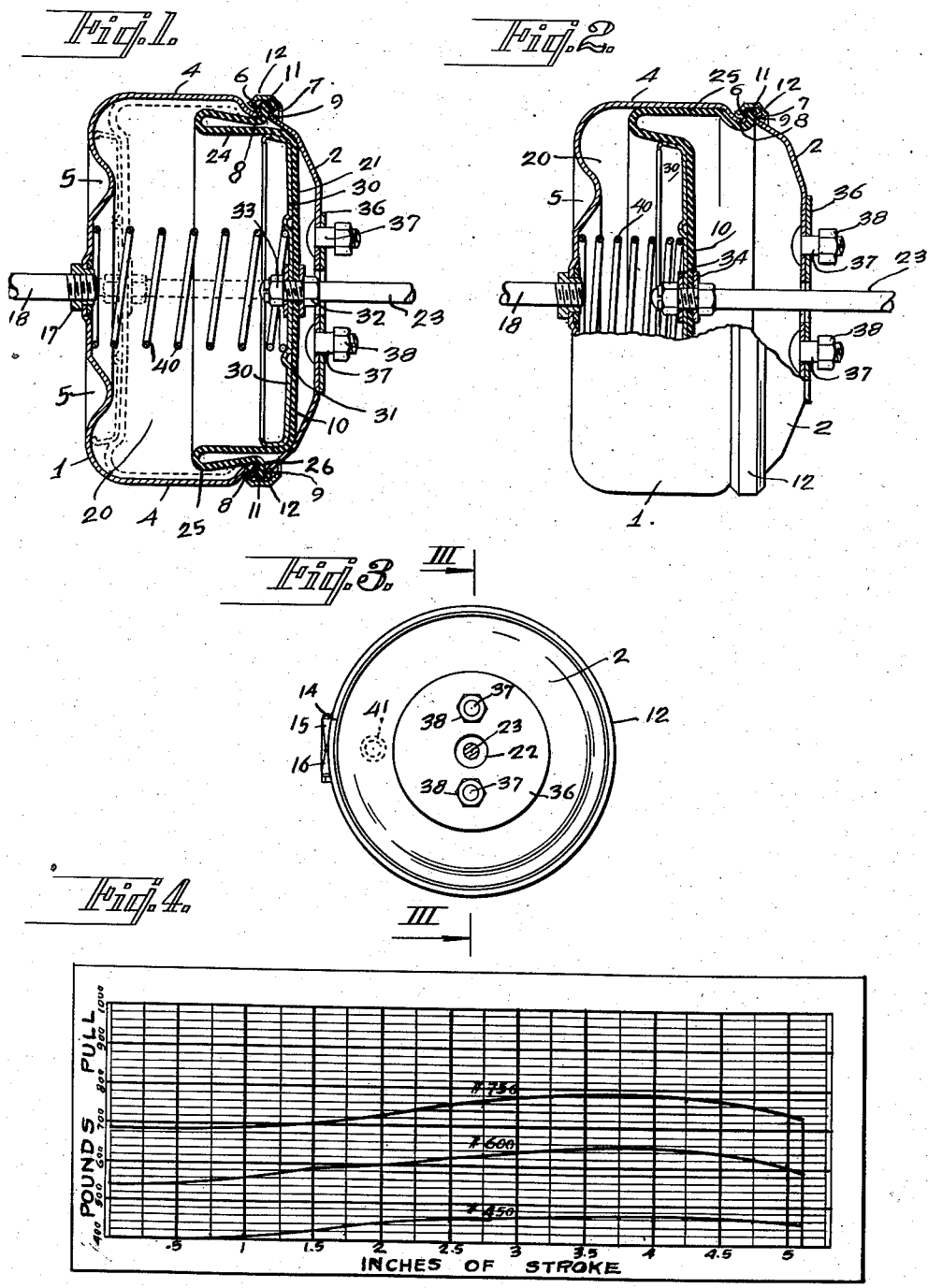
INVENTOR
EDWARD KNAUSS.
BY
ATTORNEY.

Patented Nov. 13, 1951

2,574,700

UNITED STATES PATENT OFFICE 2,574,700

DIAPHRAGM POWER CHAMBER

Edward Knauss, Los Angeles, Calif., assignor, by mesne assignments, to Industrial Management Corporation, Los Angeles, Calif., a corporation of California Application April 29, 1944, Serial No. 533,277

8 Claims. (Cl. 137—157)

1

The present invention relates to power chambers or servo-motors operated by pressure differentials exerted against a diaphragm, which find usefulness in a variety of places but which are especially adapted for actuating brakes on various kinds and types of vehicles.

There are two principal types of power chambers presently in use, one the diaphragm type and the other the piston type. Although the diaphragm type is more commonly used, both forms have distinct advantages as well as corresponding disadvantages; and it is an object of the present invention to secure the advantages found in both types in a single device at the same time eliminating the principal disadvantages of each.

Since the pull exerted by the power chamber is the effective area of the piston head over the entire length of the stroke, it is possible to get nearly 100% efficiency from the piston type of device. Although the device of the present invention may be generally classed as the diaphragm type of power chamber it secures substantially 100% piston action. It thus provides the advantages of the piston type of device, without the disadvantages such as lubrication, deterioration of the lines due to oil leakage, wearing between the piston and the cylinder resulting in a poor seal and pro tanto inoperability of the piston type, and further the disadvantages of frictional misalignment.

It is also well-known in this art that the diaphragm type power chambers are constructed of two oppositely disposed dished shells of substantially the same cross-section with outwardly extended flanges through which pass bolts which serve not only for holding the device together but for holding a flexible diaphragm therebetween. Accordingly the maximum diameter of the complete device is measured from the outer edge of the flange. Since all installations have unyielding space limitations a very large percentage thereof is taken up by the flange itself. It is an object of the present invention to produce a device which accepts the requirement of space limitations and provides the maximum piston power capacity for the space available, with diaphragm action. Not only does the device of the present invention have the advantage of the diaphragm type of device giving a perfect seal but will give an effective area for proper power actuation substantially equal to the entire inner area of the power chamber and over the full stroke of the device.

One of the great disadvantages of the diaphragm type known previously is the fact that the diaphragm is required to flex in the form of an S during the power stroke and also on the return stroke. The flexing or buckling of the diaphragm is a great source of trouble due to the excessive wear on the diaphragm not only where it is held by the bolted flanges but also at the place where it contacts the marginal edges of the diaphragm plate. It is apparent that annular space within the chamber at the middle portion of the stroke must be provided for the flexing or buckling which space further reduces the available area chamber for power. It is therefore an object of the present invention to provide a diaphragm power chamber which eliminates buckling and which will therefore produce over the entire stroke a uniform efficiency substantially equal to the entire inner cross-sectional area power chamber.

It is also an object of the present invention to produce a device which will have a power curve of substantially the same force throughout the full stroke. This appreciably reduces the excess air capacity and by eliminating the necessity of space for flexing or buckling there is likewise eliminated the necessity for removing air from a portion of the chamber which serves no useful purpose. Accordingly the present device is faster acting.

It is also an object of the present invention to provide a device of the class described which will give the maximum rated pull over the full length of the power stroke, with no loss in effective power toward the end of the stroke.

It is also an object of the present invention to provide a diaphragm of a special type so that its position of rest is that of its normal preformed shape but at the same time ready for instant action with a smooth rolling movement without flexing and without substantial wear.

It is also an object of the present invention to provide a preformed diaphragm of the type described which terminates with an outer beaded peripheral portion which not only provides for leak-proof holding of the diaphragm but also permits it to be held without bolts or other means passing through the outer edge which frequently give rise to tears, rips and leaks.

The invention contemplates such other and further objects as will be apparent to those skilled in this art and which are inherently possessed thereby. In attaining the foregoing objects, together with such other objects, advantages and capabilities as will be disclosed within the following description, there is used by way of example only the construction shown in preferred form in the accompanying sheet of drawings. Similar parts are designated by the same reference characters in the several views.

Referring to the drawings:

Figure 1 is a vertical section taken on the line III—III of Figure 3 showing the device in the "off" or released position. The broken line indicates the position of the diaphragm at the end of the full stroke or in full "on" position.

Figure 2 is a view similar to Figure 1 but partly in elevation and partly in section and showing the diaphragm in an intermediate position during the power stroke.

Figure 3 is a top plan view of the power chamber.

Figure 4 is the power curve for the device plotted for three different sizes showing the substantially straight line pull throughout the entire power stroke.

Referring now more particularly to the drawings, the housing of the power chamber consists of two principal parts, a cylindrical housing 1 and a cover member 2. The cylindrical housing 1 is formed so that its side walls 4 are substantially parallel for a distance representing the entire stroke of the device, the diameter of which defines the greatest cross-sectional area of the device. The bottom is provided with an annular depression 5 which acts as a stop at the end of the stroke and also strengthens the structure. Both the housing member 1 and the cover member 2 are turned back at their respective peripheral edges 6 and 7 to form a rounded, curved contact or bead as at 8 and 9 respectively. Between this curved contact 8 and 9 is held a flexible diaphragm 10 preformed in the position of rest shown in full lines in Figure 1. The diaphragm 10 is so formed into an integral structure to eliminate wear and to accomplish the smooth, rolling action required. The outer periphery or terminus of the diaphragm is formed with a bead 11. The entire device is held together in firm, leakproof engagement by a clamping ring 12 and secured by a single clamping ring bolt 14 with supporting lugs 15 and 16.

Beside the annular depression 5 in the bottom of the main housing or chamber 1 there is a threaded fitting 17 which is adapted to receive a pipe connection 18 for admitting pressure changes to the inner side of the diaphragm 10 and into the chamber 20.

The diaphragm 10, as has been stated, is preformed in the position shown in Figure 1 and is so formed to permit instantaneous action and a smooth, rolling motion rather than any flexing or buckling during any portion of the stroke. The diaphragm is formed with a flat top 21 having a central aperture at 22 to permit the pull rod 23 to pass therethrough, integral and substantially vertical inner walls 24 with a reverse turned outer wall 25 which is less in length than the inner wall and terminates in an outwardly extending flange 26 and bead 11.

The diaphragm is maintained in position by the diaphragm plate 30 which may be reinforced by means of annular grooves such as 31. The diaphragm plate 30 and the diaphragm are assembled for movement with the pull rod 23 by means of the diaphragm nut 32 and the diaphragm plate nut 33 with suitable washers 34. It will thus be seen that as the diaphragm moves during the power stroke in response to pressure differentials, the pull rod is moved with it and actuates whatever attachment may be secured thereto.

The cover member 2 is preferably reinforced by the support plate 36, which may be welded in place, to take the strain of the mounting studs 37 passing through the cover member and its reinforcing plate. The mounting studs 37 are supplied with suitable nuts 38 and together provide the means for holding or mounting the device in the appropriate position, although any other suitable means may be used.

Spring 40 is provided for quick return of the diaphragm after release of the pressure differential. This return spring 40 is securely fastened at both ends and its presence insures the faster return and therefore faster action of the device.

One side of the diaphragm is normally exposed to atmospheric pressure. Due to the aperture 22 it will be seen that unless one of the well-known methods of sealing this aperture is used but which permits longitudinal movement of the pull rod 23 that the right side of the diaphragm (as viewed in the drawings) will be subject to atmospheric pressure. To further secure atmospheric pressure to this side of the diaphragm additional ports such as shown at 41 in dotted lines, may be drilled in the cover member 2.

In operation, assuming that pipe 18 leads to a source of vacuum, as soon as the vacuum is applied within the chamber 20, air pressure on the right side of the diaphragm will cause the wall 25 to assume a position snugly against the inner surface of the chamber wall 4. As the vacuum is increased and the stroke continues, a force substantially equal to pressure differential multiplied by the area of the inner diameter of the chamber 20 is exerted to move the pull rod 23 during the entire stroke. During that stroke the walls 25 and 24 of the diaphragm unroll against the inner surface of the chamber wall 4 with a smooth, flowing movement until the position of full "on" is attained. There is no buckling or flexing of the diaphragm 10 either in the power stroke or in the return and no space is provided in the chamber for any flexing or buckling. Likewise there is no occasion to remove any air from any portion of the device which serves no useful purpose, but rather the entire inner area is in use for the entire power stroke.

In conventional diaphragm actuators heretofore available, the free effective area of the diaphragm has been limited to that within the clamped edge. In the applicant's device, on the other hand, ample space is provided for secure clamping means for the diaphragm without detracting from the working area thereof. The applicant's actuator makes use of the entire available mounting space less only the insignificant thickness of the chamber wall 4. In conventional actuators, on the other hand, a very substantial radial width of the clamping flanges of the diaphragm must be subtracted from the effective area of the diaphragm.

It is also to be noted that as pressure is applied on the atmosphere side of the diaphragm during the stroke there will be a tendency toward a tighter juncture and sealing at the point where the diaphragm is held by the two housing members 1 and 2. As the pressure is exerted on the diaphragm the pull will be against the bead and against the rolled edges 8 and 9, thus accomplishing a sealed holding of the diaphragm and insuring against any possible leak or distortion at this point.

In Figure 4 there is shown an actual recording of the pounds of pull for three different sizes of the device shown and disclosed herein. In a five inch stroke the full rated capacity is attained practically at the outset, but more important is the fact that this full rated capacity is maintained throughout the entire remaining stroke, a feature which has not heretofore been accomplished. It is also to be observed that there is no falling off in power toward the end of the stroke. This results from having a uniform force exerted against a uniform area throughout the entire operating stroke. It is apparent that the device utilizes the entire chamber area and thereby develops a far greater force for a given diameter than has heretofore been attained from any diaphragm type power actuator.

It will be seen also that the use of the clamping ring 12 provides a quick and economic means of assembly and disassembly which simplification not only improves the life of the device but contributes substantial advantages in the saving of time, money and labor.

The present application is a continuation in part of my earlier application filed August 2, 1940 and serially numbered 349,964, which is now abandoned.

I claim:

1. A power actuator comprising in combination, a diaphragm having an outer flange with a bead formed around its periphery, a body member and a cover member to hold said diaphragm and adapted to be connected to different pressure sources, said members having the cooperating edges thereof formed to provide beads which engage said flange along its line of joinder with its bead, and a clamping ring to hold said members on opposite sides of said flange, said clamping ring having an inwardly faced channel to receive said beads of said members and said flange, and also covering said beads.

2. A power actuator comprising in combination, a diaphragm having an outer flange with a bead formed around its periphery, a pair of cooperating housing members to hold said diaphragm and adapted to be connected to different sources of pressure, said members having the cooperating edges thereof formed to provide beads which engage said flange along its line of joinder with its bead, and a clamping ring to hold said members on opposite sides of said flange, said clamping ring having an inwardly faced channel to receive said beads of said members and said flange, and also covering said beads.

3. In a power actuator, a casing formed of a dished section and an abutting cylindrical section beaded at their adjacent edges and within the maximum diameter of said casing, and adapted to be interiorly connected to different pressure sources, a movable diaphragm within said casing formed with a beaded outer peripheral edge seated between the beaded edges of said sections and extending exteriorly thereof, characterized in that the movement of said diaphragm under a pressure differential thereacross functions to draw the beaded periphery of said diaphragm more tightly between the beaded edges of said sections to provide a tighter seal.

4. In a power actuator, a casing formed of a dished section and an abutting cylindrical section beaded at their adjacent edges within the maximum diameter of said casing, and adapted to be interiorly connected to different pressure sources, a movable diaphragm formed with reversely extending inner and outer cylindrical walls positioned within said casing, the outer wall of said diaphragm being formed with a beaded edge engaged between the beaded edges of said sections, said diaphragm being adapted to unroll along the inner wall of said maximum diameter casing section in the presence of a pressure differential upon the opposite sides thereof, said movement tending to draw said diaphragm bead from between said beaded section edges to make a tighter seal.

5. In a power actuator, a casing formed with a dished section and an abutting cylindrical section adapted to be connected to different pressure sources, the abutting edges being within the maximum internal diameter of the cylinder, a flexible diaphragm rolled upon itself to form inner and outer telescoped walls, the outer of said walls having a peripheral edge portion secured between said abutting edges and said inner wall normally extending upon both sides of said abutting edges when subjected to equal pressures on opposite sides thereof, characterized in that in the presence of a pressure difference upon opposite sides of said diaphragm said diaphragm inner wall unrolls to cause expansion of said outer wall against said cylindrical section wall to be positioned radially outside said abutting edges.

6. A power actuator comprising in combination: a diaphragm having a peripheral flange adapted to be secured in an annular groove; a first body member having a first annular seat portion substantially equal in diameter to the minimum diameter of said flange, said body member being adapted for connection to a first pressure source and being flared outwardly and extending parallelly from said seat portion whereby to form a cylindrical working chamber having an internal diameter not less than the maximum diameter of said flange; an adjoining second body member having a second annular seat portion substantially equal in diameter to said first seat portion and positioned in spaced parallel relationship therewith, said second body member being adapted for connection to a different pressure source; and clamping and interconnecting means engageable with said body members and adapted to secure the same together with said seat portion in abutting position to form a groove between said portions with said flange clamped therein whereby said diaphragm is adapted to have an effective area in said working chamber greater than the area within said flange.

7. The construction of claim 6 further characterized in that said seat portions are formed with outwardly extending beads and said clamping means is a ring with an internal groove adapted to embrace said beads to secure the same in said abutting position.

8. In combination in a power actuator of the type in which a diaphragm is mounted transversely in a cylindrical enclosure, is moved by differential pressures on opposite sides thereof, and in which said diaphragm movement is transmitted by a connecting member secured thereto; a circular diaphragm having a cup-shaped body and a peripheral bead; a first section of said enclosure having an internal diameter substantially greater than that of said diaphragm bead, said first section being necked down to a diameter substantially equal to that of said bead to form one side of a seat for said bead; a second section of said enclosure, said second section having a flanged portion adapted to cooperate with said first section to form therewith a complete seat for said bead; means to secure said sections together to retain said diaphragm bead in said seat whereby said diaphragm separates said first and second enclosure sections to form two chambers; and a plate formed with a skirt thereon secured to said diaphragm and movable therewith, said plate being positioned on the side of said diaphragm exposed to said first section and with said skirt extending theretoward, said diaphragm being folded back on itself and when under motivating pressure being supported cooperatively by said skirt and the inner wall of said first section whereby the effective pressure responsive diameter of said diaphragm is at least equal to that of said bead.

EDWARD KNAUSS.

REFERENCES CITED

The following references are of record in the file of this patent:

UNITED STATES PATENTS

| Number | Name | Date |
|---|---|---|
| 571,427 | Brown | Nov. 17, 1896 |
| 1,583,677 | Edelmann | May 4, 1926 |
| 1,790,206 | Farmer | Jan. 27, 1931 |
| 1,964,745 | Sauzedde | July 3, 1934 |
| 2,077,984 | Bukold | Apr. 20, 1937 |
| 2,078,835 | Brisson | Apr. 27, 1937 |
| 2,134,072 | Christensen | Oct. 25, 1938 |
| 2,140,458 | Kuskin | Dec. 13, 1938 |
| 2,172,694 | Blondelle | Sept. 12, 1939 |
| 2,192,548 | Gunderson | Mar. 5, 1940 |
| 2,197,075 | Fitzgerald | Apr. 16, 1940 |
| 2,208,282 | Shelor | July 16, 1940 |
| 2,283,439 | Herman | May 19, 1942 |
| 2,314,452 | Ljungstrom | Mar. 23, 1943 |
| 2,495,369 | Elliott | Jan. 24, 1950 |